US012589447B2

(12) United States Patent
  Jonkers et al.

(10) Patent No.: US 12,589,447 B2
(45) Date of Patent: Mar. 31, 2026

(54) LASER BEAM BRILLIANCE ENHANCING BEAM SPLITTING FOR LASER WELDING/BRAZING

(71) Applicant: II-VI Delaware, Inc., Wilmington, DE (US)

(72) Inventors: Jeroen Jonkers, Berlin (DE); Gunnar Koehler, Potsdam (DE); Paul Sonntag, Berlin (DE)

(73) Assignee: II-VI DELAWARE, INC., Wilmington, DE (US)

( * ) Notice: Subject to any disclaimer, the term of this patent is extended or adjusted under 35 U.S.C. 154(b) by 976 days.

(21) Appl. No.: 17/827,905

(22) Filed: May 30, 2022

(65) Prior Publication Data

US 2023/0381888 A1 Nov. 30, 2023

(51) Int. Cl.
  B23K 26/06 (2014.01)
  B23K 1/005 (2006.01)
  (Continued)

(52) U.S. Cl.
  CPC ........ B23K 26/0604 (2013.01); B23K 1/0056 (2013.01); B23K 26/0643 (2013.01);
  (Continued)

(58) Field of Classification Search
  None
  See application file for complete search history.

(56) References Cited

U.S. PATENT DOCUMENTS 5,781,347 A * 7/1998 Fukushima .......... G02B 6/4286
                                                359/674
6,608,281 B2  8/2003 Ishide et al.
  (Continued)

FOREIGN PATENT DOCUMENTS

CN     111399140 A * 7/2020 ........... G02B 6/4298
DE       2708039 A1    4/1979
  (Continued)

OTHER PUBLICATIONS

CN 111399140 A (Chen, Jian-Lin) Jul. 10, 2020 [retrieved on Jul. 17, 2025]. Retrieved from Foreign Image and Text database, translation by Clarivate Analytics (Year: 2020).*
  (Continued)

*Primary Examiner* — Edward F Landrum
*Assistant Examiner* — Theodore J Evangelista
(74) *Attorney, Agent, or Firm* — Blank Rome LLP

(57) ABSTRACT

A laser processing head can be used for joining (e.g., welding, brazing, soldering, etc.) workpieces. A collimator collimates laser light, which passes to a beam splitter. The beam splitter has anti-reflective and high-reflective coatings on peripheral and inner areas of the beam splitter. The beam splitter splits the collimated light into central or inner light from the inner area and peripheral light from the peripheral area. A main output in communication with the beam splitter directs at least the peripheral light into a main beam toward the workpieces. For example, a cable can feed a brazing wire adjacent the main beam for brazing the workpieces together. Meanwhile, a secondary output in communication with the beam splitter directs at least the central light into a secondary beam, which can be used to pre-heat the workpiece, post-heat the workpiece, or remove any surface coating from the workpiece.

23 Claims, 7 Drawing Sheets

(51) Int. Cl.

| | |
|---|---|
| *B23K 26/064* | (2014.01) |
| *B23K 26/067* | (2006.01) |
| *B23K 26/073* | (2006.01) |
| *G02B 6/28* | (2006.01) |

(52) U.S. Cl.

CPC ........ *B23K 26/0648* (2013.01); *B23K 26/067* (2013.01); *B23K 26/0736* (2013.01); *G02B 6/2817* (2013.01)

(56) References Cited

U.S. PATENT DOCUMENTS

| | | | |
|---|---|---|---|
| 6,992,965 | B1 | 1/2006 | Glushko et al. |
| 11,112,615 | B2 | 9/2021 | Heinrici et al. |
| 2019/0118297 | A1* | 4/2019 | Abramov ........... B23K 26/0622 |
| 2022/0088703 | A1* | 3/2022 | Kayahara .............. B23K 26/21 |

FOREIGN PATENT DOCUMENTS

| | | | | | |
|---|---|---|---|---|---|
| DE | 102015112537 | A1 | | 1/2017 | |
| EP | 2402107 | A1 | | 1/2012 | |
| EP | 3117950 | A1 | | 1/2017 | |
| EP | 3219832 | A1 | | 9/2017 | |
| EP | 3486019 | A1 | | 5/2019 | |
| EP | 3486019 | B1 | * | 11/2021 | .............. B23K 1/19 |
| WO | 2016025701 | A1 | | 2/2016 | |

OTHER PUBLICATIONS

EP 3486019 B1 (Müller Alexander) Nov. 3, 2021 [retrieved on Jul. 18, 2025]. Retrieved from Foreign Image and Text database, translation by Clarivate Analytics (Year: 2021).*

"Crystalline Mirror Coatings, Thorlabs, Inc.", URL: https://www.thorlabs.com/newg rouppage9. cfm ?objectg roup id=13322#ad-image0Archiviert in http://archive.org am Jan. 23, 2022 [abgerufen am Jan. 18, 2024].

* cited by examiner

LASER BEAM BRILLIANCE ENHANCING BEAM SPLITTING FOR LASER WELDING/BRAZING

BACKGROUND OF THE DISCLOSURE

Certain joining processes may be used to join different workpieces together. For example, a laser brazing process joins different workpieces together by melting a brazing material with a laser beam, allowing the melted brazing material to flow into a seam between the workpieces, and forming a joint in the seam between the workpieces. The brazing material may be a wire having a melting point lower than the melting point of the materials of the workpieces. The brazing wire is positioned between the laser beam and the workpieces being joined and is moved along the seam of the workpieces during the brazing process to fill and create the joint. A similar joining process involves welding workpieces together using a filler wire made of the same material as at least one of the workpieces.

For a successful joining (e.g., brazing or welding) process, the wire is moved along the seam while a force is kept constant on at least one of the workpieces. To do this, the wire or some other element can be positioned against one or both of the workpieces to apply a force as the wire is melted with the laser beam.

In some implementations, a main laser beam is used to create a main melting spot for melting the wire for brazing, welding, etc., while a second laser beam is used to create one or more relatively small heating spot(s) in front of the main melting spot. The heating spot(s) can be used to pre-heat the workpiece(s) and/or to remove a coating from the workpiece(s).

To create the small heating spot(s), a laser processing head can use an independent laser source separate from the main laser source. Instead of using separate laser sources, a laser processing head can use a second laser beam derived from the main laser beam. During the joining process, relatively small spots are needed for efficient heating so there are a couple of solutions available.

In a first solution, the laser light used for pre-heating or coating removal is delivered by the same focus lens used to focus the main laser beam. The laser light for pre-heating and/or coating removal is typically passed very close to the wire and may touch the wire during motion (e.g., during a curve), leading to unstable pre-heating and hence an unstable joining process.

In a second solution, the main beam can be split so that a second fiber can transport part of the light to a second focusing unit that creates the heating spot(s). Unfortunately, existing arrangements may not achieve the relatively smaller spots due to the low brilliance of the light being coupled into the second fiber.

What is needed is a way to deliver one or more heating spot(s) in front of a main brazing/welding spot so a workpiece can be pre-heated using heating spot(s) that are relatively small and that do not interfere with brazing/welding wire.

The subject matter of the present disclosure is directed to overcoming, or at least reducing the effects of, one or more of the problems set forth above.

SUMMARY OF THE DISCLOSURE

As disclosed herein, a laser processing head is used for directing laser light to a workpiece. The laser processing head comprises a collimator, a beam splitter, a main output, and a secondary output. The collimator is disposed in an optical axis of the laser light and is configured to collimate the laser light into collimated light. The beam splitter is disposed in the collimated light and has at least two portions. The at least two portions comprise an anti-reflective portion and a high-reflective portion. The beam splitter is configured to split the collimated light into first light from a first of the at least two portions and into second light from a second of the at least two portions. The main output is disposed in optical communication with the beam splitter, and the main output is configured to direct at least the first light into a main laser beam toward the workpiece. The secondary output is disposed in optical communication with the beam splitter, and the secondary output is configured to direct at least the second portion into a secondary laser beam adjacent the main laser beam.

As disclosed herein, a laser processing head is used for joining workpieces together using laser light and a wire. The laser processing head comprises a collimator, a beam splitter, a main output, a secondary output, and a cable. The collimator is disposed in an optical axis of the laser light and is configured to collimate the laser light into collimated light. The beam splitter is disposed in the optical axis between the collimator and the main output. The beam splitter has an anti-reflective portion on a peripheral area thereof and has a high-reflective portion on an inner area thereof. The peripheral area surrounds the inner area. The anti-reflective portion is configured to at least partially pass peripheral light of the collimated light to the main output, and the high reflective portion is configured to at least partially reflect inner light of the collimated light. The main output is disposed in the optical axis and is configured to direct any of the collimated light passed through/from the beam splitter into a main laser beam toward the workpieces. The secondary output is disposed in optical communication with the beam splitter. The secondary output is configured to direct any of the collimated light reflected from the beam splitter into a secondary laser beam adjacent the main laser beam. The cable is configured to feed the wire into the main laser beam.

As disclosed herein, a laser processing head is used for joining workpieces together using laser light and a wire. The laser processing head comprises a collimator, a beam splitter, a main output, a secondary output, and a cable. The collimator is disposed in an optical axis of the laser light and is configured to collimate the laser light into collimated light. The beam splitter is disposed in the optical axis between the collimator and the main output. The beam splitter has an anti-reflective portion on an inner area thereof and has a high-reflective portion on a peripheral area thereof. The peripheral area surrounding the inner area. The high-reflective portion is configured to at least partially reflect peripheral light of the collimated light to the main output, and the anti-reflective portion is configured to at least partially pass inner light of the collimated light. The main output is disposed in the optical axis and is configured to direct any of the collimated light reflected from the beam splitter into a main laser beam toward the workpieces. The secondary output is disposed in optical communication with the inner area of the beam splitter. The secondary output is configured to direct any of the collimated light passed through/from the beam splitter into a secondary laser beam adjacent the main laser beam. The cable is configured to feed the wire into the main laser beam.

The secondary output can comprise a focusing lens and a waveguide. The focusing lens is disposed in optical communication with the beam splitter and is configured to focus any of the collimated light, communicated from the beam splitter and incident to the focusing lens. The waveguide has an input disposed in optical communication with the focusing lens and has an output disposed in optical communication toward the workpiece. The waveguide can comprise an optical fiber or a bundle of microfibers, and the output of the waveguide can comprise a micro-lens, an optical block, a beam shaping element, or a plain tip.

A method disclosed herein is used to direct laser light to a workpiece. The method comprises: collimating the laser light into collimated light along an optical axis; splitting the collimated light into first light and second light using a beam splitter having at least two reflective portions, including an anti-reflective portion and a high-reflective portion; directing at least a portion of the first light into a main laser beam toward the workpiece; and directing at least a portion of the second light into a secondary laser beam toward the workpiece.

The foregoing summary is not intended to summarize each potential embodiment or every aspect of the present disclosure.

DETAILED DESCRIPTION OF THE DISCLOSURE

Figures 1A, 1B:
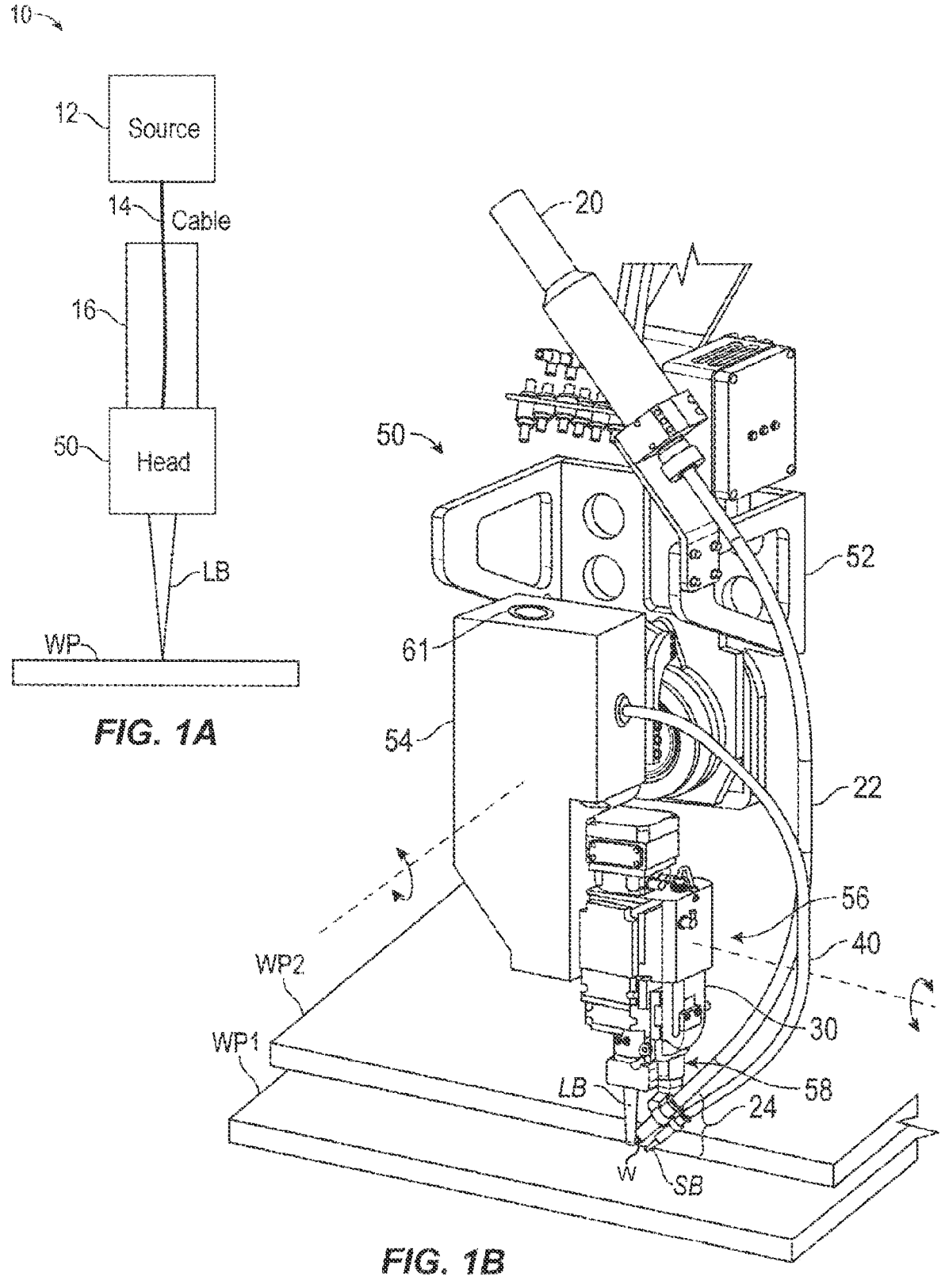
FIG. 1A illustrates a laser delivery system according to the present disclosure.
FIG. 1B illustrates a perspective view of a laser processing head according to the present disclosure.

FIG. 1A illustrates a laser delivery system 10 according to the present disclosure. A laser source 12 generates laser light that propagates along a fiber optic cable 14 to a laser processing head 50. The laser source 12 can be a multi-mode or a single-mode laser depending on the laser beam quality required. A single-mode laser delivers a higher quality laser beam, but normally such high quality is not needed for brazing or welding.

The laser processing head 50 can be moved relative to the workpiece(s) WP and/or can have the workpiece(s) WP moved relative to it. For example, the laser processing head 50 can be moved by a gantry system, robotic arm, or other apparatus 16 used in the art. Internally, the laser processing head 50 includes optics to focus the laser energy in a laser beam LB to the workpiece(s) WP to achieve brazing, soldering, welding, or some other joining process.

Looking in more detail, FIG. 1B shows a perspective view of a laser processing head 50 for a laser processing apparatus (not shown). Not all of the components of the laser processing head 50 are shown. In general, the laser processing head 50 includes a frame 52, a support body 54 coupled to the frame 52, and a focusing unit or arm 56 coupled to the support body 54. In one configuration, the head 50 can be tactile so that the arm 56 can be moved laterally and can be used for tactile joining in which a lateral force of the wire W is used to follow a seam. In other configurations, the head 50 can be non-tactile so this element 56 may just be a focusing unit.

The laser processing head 50 can be used for joining workpieces WP1, WP2 by emitting a laser beam LB to braze, solder, weld, or otherwise join the workpieces WP1, WP2 together. In the present example, reference is made to brazing as the lasing process, but the teachings of the present disclosure can apply equally well to other joining processes, such as soldering, welding, and the like.

A laser cable (not shown) connects to the support body 54 to provide laser light, which is routed through the head 50 to produce a laser beam LB towards the workpieces WP1, WP2. A receiver 61 for the laser cable is only schematically shown in FIG. 1B.

A wire feeder 20 is mounted on the frame 52 and feeds a consumable wire of brazing material for the brazing process through a wire delivery cable 22. The wire feeder 20 advances the brazing wire during the brazing process, and the wire feed cable 22 feeds the brazing wire at a flat angle to a wire outlet 24 connected to an end 58 of the head's arm 56.

The head 50 is shown relative to example workpieces WP1, WP2 to be joined. The laser brazing head 50 includes, among other features, the frame 52 and the support body 54 coupled to the frame 52. The support body 54 can be movable relative to the frame 52 to assist with the tracking of the laser processing head 50 along a seam between the workpieces WP1, WP2. However, the support body 54 may also be stationary relative to the frame 52.

The arm 56 is coupled to the support body 54, and a motor (not shown) on the support body 54 can move the arm 56 relative to the support body 54 to facilitate proper positioning of an end 58 of the arm 56 relative to the workpieces WP1, WP2. The wire feeder 20 is coupled to the frame 52 and feeds the consumable wire of brazing material through the wire delivery cable 22. The wire extends from the wire output 24 of the wire delivery cable 22 at the end 58 of the arm 56 and is positioned in the path of the main laser beam LB.

During operation, the laser beam LB melts the wire so the material of the wire may flow between and join the workpieces WP1, WP2. During typical operations, only the wire contacts the workpieces WP1, WP2 and is used for tracking along the seam. However, in some implementations, the wire is too soft for this. Accordingly, while not visible in FIG. 1B, additional support may be needed from a fixed element, such as a tracking finger, needle, or another extension, which extends from the end 58 of the arm 56 to run along the seam. In any case, the process can automatically control the force between the fixed element and at least one of the workpieces WP1, WP2.

As shown in FIG. 1B, the laser brazing head 50 includes a force sensor 30 positioned on the end 58 of the arm 56. The force sensor 30 can measure the forces on the end 58 of the arm 56. The measured forces can be used to control the brazing process and the tracking of the end 58 of the arm 56 along a seam between the workpieces WP1, WP2.

To braze the workpieces WP1, WP2 together, a secondary laser beam SB is derived or split from the main laser beam inside the head 50. The main laser beam LB is used to melt the brazing material of the consumable wire being fed from the outlet 24, while the secondary beam SB is used for pre-heating the workpieces WP1, WP2 to be connected. As shown, a secondary fiber 40 can feed the secondary laser beam SB from the head 50 to the end 58 of the head's arm 56.

In addition to preheating the workpieces WP1, WP2, the secondary laser beam SB can be used to remove portions of a surface coating from the workpiece(s) WP1, WP2. The workpieces WP1, WP2 to be joined may already be coated at the junction point with anti-corrosion or another type of surface coating, including unwanted surface contamination. The surface coating can adversely affect the joining process during brazing because the coating can have different properties than the material of the workpieces (WP1, WP2) when heated, for example. This can lead to the formation of bubbles or inclusions in the coating at the seam. These effects can hurt the quality of the joining process. Accordingly, the secondary fiber 40 delivers a power-scalable, separate laser beam SB directed at one or both of the workpieces WP1, WP2 to pre-process the workpiece(s) WP1, WP2 by: (i) pre-heating the workpiece(s) WP1, WP2 and/or (ii) evaporating surface coating on the workpiece(s) WP1, WP2. This arrangement can have advantages when the workpieces WP1, WP2 have a surface coating that makes them more difficult to wet with brazing material or the like.

Figure 2:
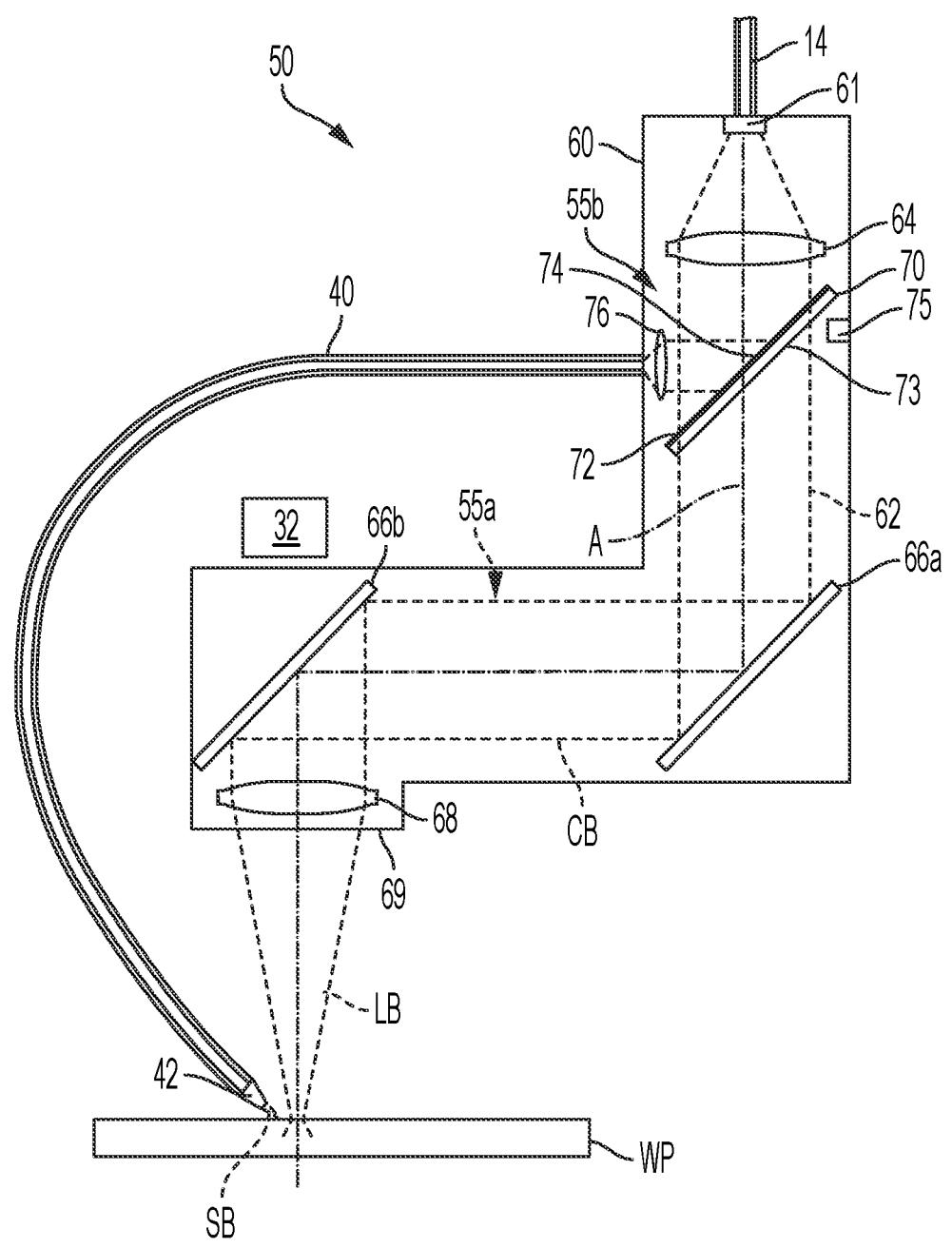
FIG. 2 illustrates a schematic view of a laser processing head having a secondary fiber according to a first embodiment of the present disclosure for delivering a secondary beam to a workpiece.

FIG. 2 illustrates a schematic view of a laser processing head 50 having a first arrangement for delivering a secondary beam SB toward workpiece(s) WP. The laser processing head 50 includes a housing 60 having internal optics 62. The housing 60 can include a support body, an arm, and other features discussed previously. A receiver 61 at one end of the housing 60 can couple to a laser cable 14, which conducts high-power laser light into the housing's interior.

During operation, the internal optics 62 collimate and focus the high-power laser light emitted in the housing 60. For example, the internal optics 62 can include a collimator 64 and a focusing lens 68. The collimator 64 in the housing 60 is disposed in the optical axis A of the laser light in the housing 60. The collimator 64 is configured to collimate the laser light into collimated light CB.

A beam splitter 70 is also disposed in the optical axis A. The beam splitter 70 has portions, coatings, or the like disposed on areas of the beam splitter 70. The portions include an anti-reflective portion 72 and include a high-reflective portion 74.

The areas having these anti-reflective and high-reflective portions 72, 74 can include a peripheral area and a central or inner area. The central or inner area is generally disposed on or close to the optical axis A (although the position of the inner area can be adjusted as disclosed herein). For its part, the peripheral area surrounds the inner area. The beam splitter 70 is configured to split the collimated light CB into central or inner light from the inner area and into peripheral light from the peripheral area of the beam splitter 70. (For the discussion that follows, the inner area and inner light are generally described as a central area and central light. However, this is not meant to say that the area lies at the center of the beam splitter or that the light lies at the center of the optical axis. Other arrangements are possible as disclosed below.)

Reference to anti-reflective in general means that the anti-reflective portion 72 tends to not reflect the laser light at the subject wavelength(s) or range. Likewise, reference to high-reflective means that the high-reflective portion 74 tends to reflect the laser light at the subject wavelength(s) or range. The values for non-reflectivity and reflectivity can depend on the implementation. In general, the high-reflective portion 74 may be configured to reflect 50% or more of the incident light, but other values for the reflectivity may be used. Indeed, the surface area of the high-reflective portion 74 may be increased to reflect the laser light even with the portion 74 having a lower value of reflectivity, which may be advantageous in some applications. A 50% reflectivity would require a larger central or inner high-reflective portion 74 and would in turn require a larger diameter of fiber 40. Such a solution may only be suitable if the faction of light needed for pre-heating is small (e.g., smaller than 10%). Instead, a much higher reflectivity than 50% may be preferred for the high-reflective portion 74 for most implementation. Overall, for example, the reflectivity of the high-reflective portion 74 can be above 99.5%, and the reflectivity of the anti-reflective portion 72 can be below 0.5%.

A main output 55a of the head 50 is disposed in optical communication with the beam splitter 70 and is configured to direct at least the peripheral light into the main laser beam LB toward the workpiece(s) WP. Meanwhile, a secondary output 55b of the head 50 is disposed in optical communication with the beam splitter 70 and is configured to direct at least a central portion into a waveguide 40.

In the present example, the beam splitter 70 comprises the anti-reflective portion 72 in the form of a coating or the like disposed on the peripheral area of the beam splitter 70. The beam splitter 70 also comprises the high-reflective portion 74 in the form of a coating or the like disposed on the central area of the beam splitter 70.

The coatings for the portions 72, 74 are preferably disposed on the front surface of the beam splitter 70. Meanwhile, the back surface of the beam splitter 70 is preferably coated with an AR coating 73. This coating 73 on the back surface does not need to be a lithographic coating, and the whole back surface can have the same AR coating 73. Because the coatings 72, 73, 74 on the surfaces may induce some stress in the beam splitter 70, providing coatings 72, 73, 74 on both front and back surfaces is preferred to cancel out competing stresses.

The high-reflective coating 74 is configured to at least partially reflect the central light to the secondary output 55b. By contrast, the anti-reflective coating 72 is configured to at least partially pass the peripheral light to the main output 55a. As will be appreciated, any light passing through HR coating 74 will become part of the main laser beam LB, but light reflected by the AR coating 72 may miss lens 76 and will be lost. Therefore, a preferred embodiment may use a low (<0.5%) reflectivity for the AR coating 72.

In general and as shown, the main output 55a includes the focusing lens 68 disposed in the optical axis A. The focusing lens 68 is configured to focus any of the collimated light CB incident thereto into the main laser beam LB toward the workpiece(s) WP. Additionally, the main output 55a can also include at least one reflector 66a-b disposed in the optical axis A between the beam splitter 70 and the focusing lens 68. The reflector 66a-b is configured to reflect any of the collimated light CB incident thereto.

For its part, the secondary output 55b for the secondary beam SB comprises a focusing lens 76 and a waveguide 40. The focusing lens 76 is disposed in optical communication with the high-reflective coating 74 on a central area of the beam splitter 70 and is configured to focus the central light. The waveguide 40, which can be an optical fiber, has an input disposed in optical communication with the focusing lens 76 and has a distal end 42 disposed in optical communication toward the workpiece(s) WP.

As noted above, the collimator 64 collimates the laser light from the laser cable 14 into the collimated beam CB. The collimator 64 can have one or more lenses (not shown) that collimate the laser light. As will be appreciated and as shown here, the collimation can be achieved using a single lens for the collimator 64. In alternative arrangements, the collimator 64 can offer zoom collimation, for example, using two or more lenses.

The focusing lens 68 focuses the collimated beam CB into the main laser beam LB toward a focal point that is then directed toward the workpiece WP for achieving the purposes of the laser process, such as brazing, welding, soldering, etc. The output 69 of the housing 60 can include any appropriate cover slide, nozzle, cross-jet, cooling, etc. Other arrangements are possible. (Reference to a lens, a lens element, a lens group, etc. are interchangeable, and it will be appreciated that any of the referenced lenses or the like can be comprised of one or more lens optics—i.e., transmissive optic to focus, disperse, or collimate the laser light.)

Following the previous examples related to brazing, the laser processing head 50 can be a brazing head for brazing components of the workpiece(s) WP together. In the context of brazing, for example, the head 50 may be a component of a fixed optic brazing system where the head 50 is mounted to an apparatus, such as a robot or a gantry (16: FIG. 1), configured to move the head 50 relative to the workpiece(s) WP being joined. Alternatively, the workpiece(s) can be moved with respect to head 50.

The internal optics 62 may also include several other components, such as other lenses or mirrors, positioned between the receiver 61 and the output 69 where the laser beam LB exits the internal optics 62. For example, the head 50 can use the reflectors or mirrors 66a-b to guide or otherwise manipulate the collimated beam CB.

The laser light exits from the receiver 61 as a beam cone or in a cone shape before entering the collimator 64. The laser light is collimated in the collimated beam CB exiting the collimator 64. The collimated beam CB is reflected by the mirrors 66a-b that direct the collimated beam CB to the focusing lens 68, which ultimately focuses the laser light as the main laser beam LB out the housing's output 69.

As noted, the beam splitter 70 disposed in the collimated beam CB from the collimator 64 includes the anti-reflective (AR) coating 72 about the periphery of the splitter's surface and includes the high reflective (HR) coating 74 toward the center of the splitter's surface. The HR coating 74 can have an oval shape so that the oval-shaped coating 74 disposed at an angle can therefore reflect the secondary laser beam SB having a cylindrical shape toward the focusing optic 76 for the secondary fiber 40. In turn, the secondary fiber 40 delivers the secondary beam SB to the output 42, which directs the secondary beam SB to the workpiece(s) WP. This output 42 can include any appropriate optics, cover slide, cross-jet, cooling, etc.

In the arrangement described above, the lens 76 can focus light to the fiber 40 up to a maximum angle. Any light beyond this maximum angle will not be guided by fiber 40. If the diameter of the enclosed secondary beam SB reflected towards the lens 76 is large, the focal length of the lens 76 needs to be increased so the maximum angle for the light is not exceeded. The larger focal length results in a larger focus of the lens 76 such that a larger core of the optical fiber 40 is needed. This holds for all possible light beams over the whole range of power variation. For this reason, laterally (horizontally) translating the beam splitter 70 is a preferred way to adjust the power for the secondary beam SB.

In one configuration, the coatings 72, 74 can be lithographically structured coatings and can have an accuracy to the micrometer range to provide high-power beam splitting. In general, the coatings 72, 74 can be dielectric coatings, metallic coatings, or metal-dielectric coatings on a suitable substrate, which is preferably transparent to the wavelength of transmission to reduce absorption and heating. The coatings 72, 74 can be applied by thermal electron beam evaporation, sputtering, magnetron sputtering, ion beam sputtering, lithography, a combination of structuring and coating, or other technique.

In general, lithography references a way to apply two different coatings close to each other on a substrate. The lithography can involve photolithography, optical lithography, shadow masking and deposition, and other processes. For example, photolithography can use a photoresist to mask selected surface areas of the substrate during different stages of applying coatings. In principle, a photoresist can be applied to the surface of the substrate and can be structured to a desired shape to cover an area of the surface. One of the coating portions (e.g., AR or HR) can be applied to the substrate to adhere to the exposed surface area. The photoresist can be developed and lifted off, and the process can be repeated for another coating portion (e.g., HR or AR).

Also, a coating portion (AR or HR) can be applied over a whole area. A photoresist can be applied, structured, developed, and then etched away to expose selected areas for further coating steps. In other examples, a shadow mask can be used on the substrate during the deposition of coating materials to realize different areas for anti-reflection and high-reflective coatings. These and other processes can be used.

Coatings 72, 74 are preferred so that a sharp delineation between the antireflective and high-reflective areas can be made on the surface of a monolithic substrate for the beam splitter. Still, the beam splitter 70 can have portions, sections, or the like that are constructed together to form the antireflective and high-reflective areas.

In most cases, the most brilliant part of the laser light is located near the optical axis A. The beam splitter 70 having the HR coating 74 is used to couple this more brilliant part of the laser light into the secondary fiber 40. In general, the surface area of HR coating 74 is much smaller than the surface area of the AR coating 72 because the fraction of light needed for pre-heating may be below 50% of the total laser light and because only the most intense part of the beam is used. Due to the much higher local brilliance, the focal length of lens 76 can be made small resulting in a small focus, and the secondary fiber 40 can have a core diameter below 0.2 mm. The smaller core diameter of the secondary fiber 40 can produce a much smaller heating spot(s), can allow for better focus-shaping of the spot(s), and can provide better beam-shaping to realize different spot geometries. As an additional advantage, significantly smaller outcoupling optics (e.g., lens 76) may be needed when using the central light from the optical axis A of the collimated beam CB.

The beam splitter 70 is placed at an angle (e.g., 45-degrees) in the collimated beam CB from the collimator 64 so that a cylindrically-shaped collimated secondary beam SB travels towards the secondary fiber 40 from the elliptical-shaped or oval-shaped central area having the HR coating 74. The optical power coupled into the secondary fiber 40 can be adjusted by moving, shifting, translating, rotating, etc. the splitter 70 relative to the central axis A of the collimated main beam CB. The movement of the splitter 70 alters the amount of the central light reflected by the HR coating 74 to the lens 76 and fiber 40, because the intensity in the collimated beam CB typically decreases with respect to the distance to the optical axis A. The angular orientation of the beam splitter 70 can be adjusted relative to the collimated beam CB using one or more actuators 75, such as a motor, solenoid, or the like. Changing the angular orientation of the beam splitter 70 would tend to reflect light away from the fixed lens 76. A lateral translation of the beam splitter 70 offset from the central axis A using one or more actuators 75, such as a motor, solenoid, or the like as discussed below with reference to FIGS. 9A-9B, may be preferred so that the reflected light always passes through the fixed lens 76.

As shown, the head 50 typically has two reflectors or mirrors 66*a-b* to route the collimated beam CB in the housing 60. This arrangement is used because reflector 66*b* allows for rotation of the arm (56; FIG. 1B) while keeping the LB focused on the feeding wire. This arrangement is also used in part so a camera or other imaging sensor 32 can monitor the process based on light reflected from the process and passing back through the outlet 69 to the second reflector 66*b*. Image sensor 32 may include a separate lens to concentrate the light on the detector surface. As an alternative arrangement, the collimated beam CB can be separated using a beam splitter that replaces one of these reflectors 66*a-b*.

Figure 3:
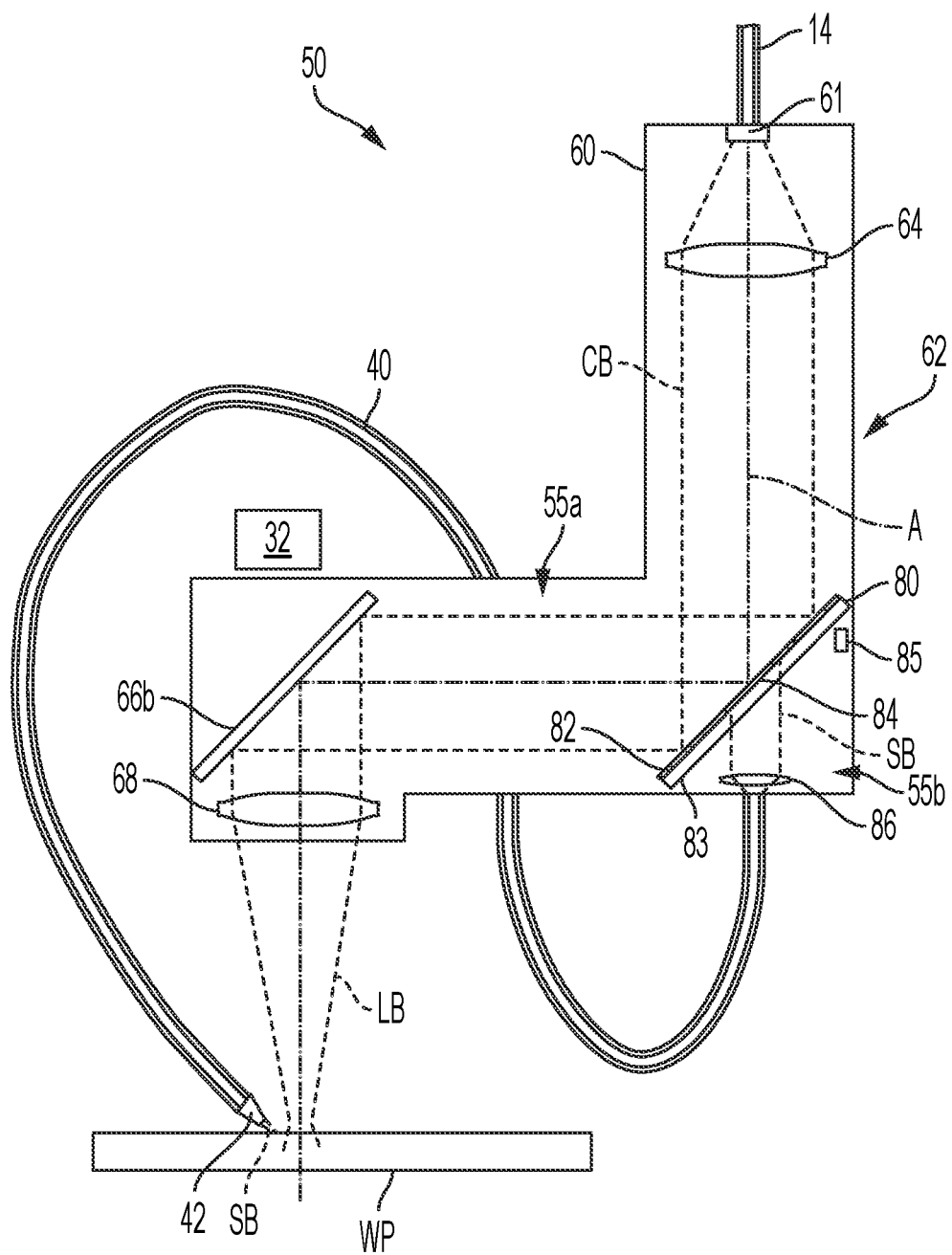
FIG. 3 illustrates a schematic view of a laser processing head having a secondary fiber according to a second embodiment of the present disclosure.

For example, FIG. 3 illustrates a schematic view of a laser processing head 50 having a second arrangement for delivering a secondary beam SB toward workpiece(s) WP. Here, one of the reflectors in the head 50 is replaced by a beam splitter 80 according to the present disclosure.

The beam splitter 80 includes a high reflective (HR) coating 82 about the periphery of the splitter 80 and includes an anti-reflective (AR) coating 84 toward the center of the splitter 80. (Again, the coatings 82, 84 are preferably disposed on the front surface of the beam splitter 80. Meanwhile, the back surface of the beam splitter 80 preferably has an AR coating 83, at least on the portion of the surface through which light is transmitted. Also, if appropriate, one or more actuators 85 can be used to move the beam splitter 80.)

The head 50 includes a main output 55*a* having a reflector 66*b* and a focusing lens 68 to direct a portion of the laser light in the main laser beam LB toward the workpiece(s) WP. The head 50 also includes a secondary output 55*b* to direct a portion of the laser light in a secondary laser beam SB toward the workpiece(s) WP. Here, the secondary output 55*b* includes a focusing lens 86 and a waveguide or optical fiber 40. The same focusing lens 86 can be used here as the focusing lens in FIG. 2, just as the same waveguide or optical fiber 40 can be used.

On the beam splitter 80, the AR coating 84 can have an elliptical or oval shape so that the secondary laser beam SB having a cylindrical shape is passed toward the focusing optic 86 for the secondary fiber 40. The coatings 82, 84 can be structured as before, but the coatings 82, 84 are arranged with the AR coating 82 in the central area to pass the more brilliant central light. The HR coating 84 is arranged in the peripheral area of the beam splitter 80 to reflect the less brilliant peripheral light for the main laser beam LB. As noted, the splitter 80 can be moved to regulate the power provided for pre-heating. Moving the splitter 80 can be coupled with moving the lens 86 and the entrance of the fiber 40. As an alternative, a coupled second mirror can be used.

Figure 4:
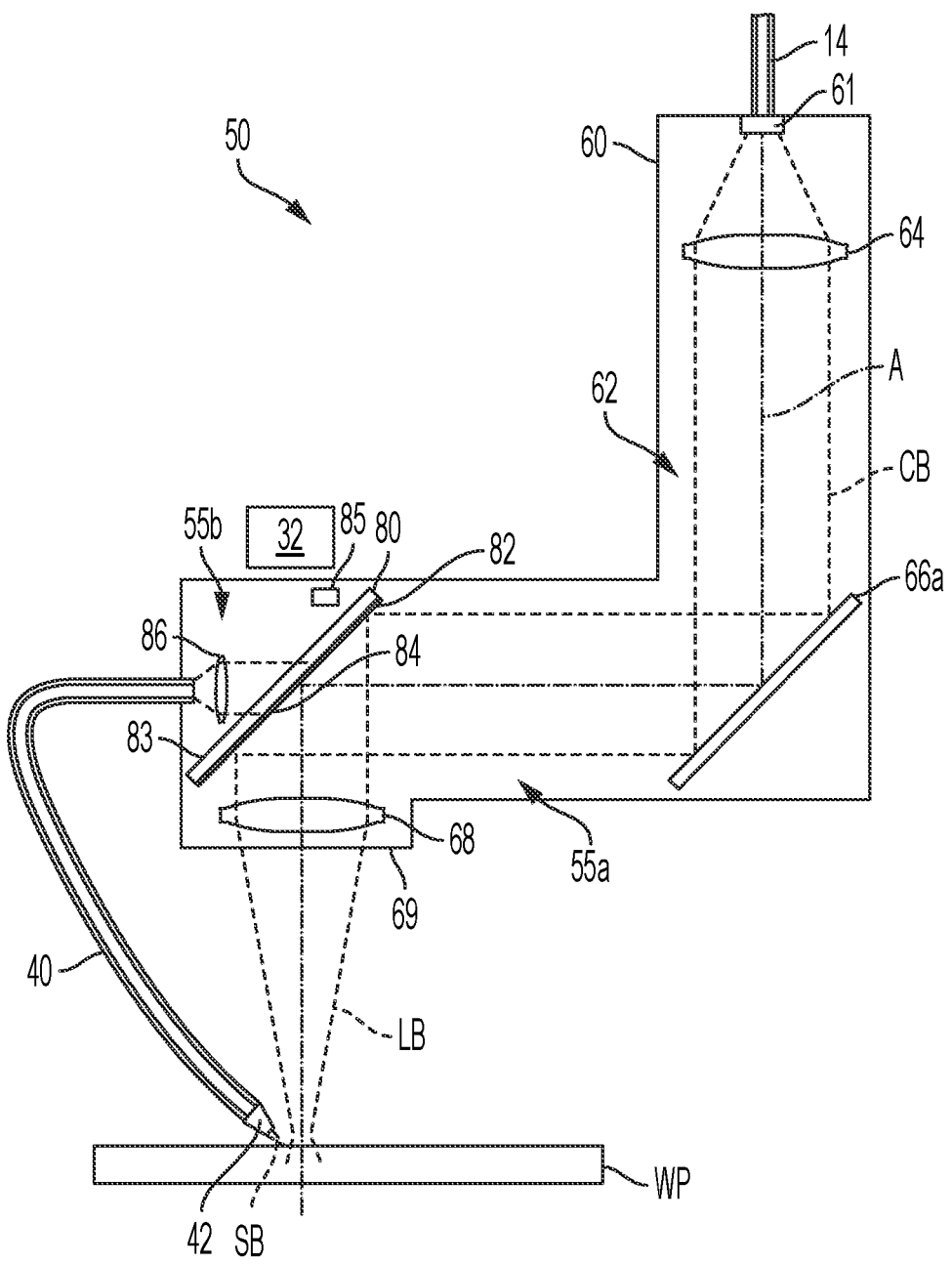
FIG. 4 illustrates a schematic view of a laser processing head having a secondary fiber according to a third embodiment of the present disclosure.

FIG. 4 illustrates a schematic view of a laser processing head 50 having a third arrangement for delivering a secondary beam SB toward workpiece(s) WP. This arrangement is similar to that disclosed above, except that the beam splitter 80 replaces a reflector located toward the output end 69 of the laser processing head 50. (Again, the coatings 82, 84 are preferably disposed on the front surface of the beam splitter 80. Meanwhile, the back surface of the beam splitter 80 preferably has an AR coating 83, at least on the portion of the surface through which light is transmitted. Also, if appropriate, one or more actuators 85 can be used to move the beam splitter 80.)

The head 50 includes a main output 55*a* having a reflector 66*a* and a focusing lens 68 to direct a portion of the laser light in the main laser beam LB toward the workpiece(s) WP. In this arrangement, the reflector 66*a* is also part of the secondary optical path. The head 50 also includes a secondary output 55*b* to direct a portion of the laser light in a secondary laser beam SB toward the workpiece(s) WP. Here, the secondary output 55*b* includes a focusing lens 86 and a waveguide or optical fiber 40.

This arrangement having the beam splitter 80 at the output end 69 may not be preferred because an imaging sensor 32, such as a camera, may be used at this location to image reflected light to monitor the process being performed by the laser beam LB. Including the beam splitter 80 in this path can complicate the monitoring by altering how returned light from the process can reach the imaging sensor 32. Also, moving the beam splitter 80 to regulate the power for pre-heating may require moving the lens 86 and the entrance of the fiber 40.

Figure 5:
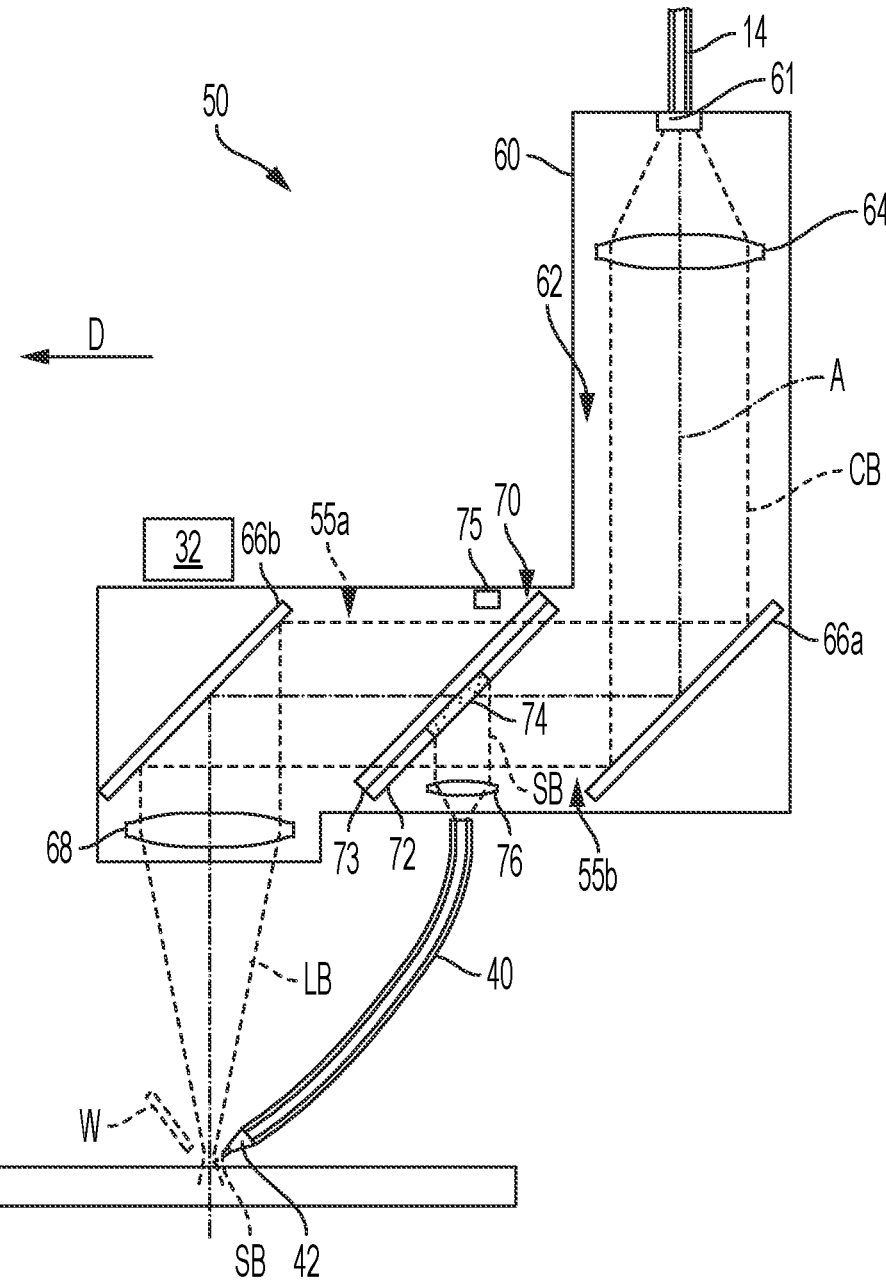
FIG. 5 illustrates a schematic view of a laser processing head having an alternative arrangement of the present disclosure.

FIG. 5 illustrates a schematic view of a laser processing head 50 having an alternative arrangement. In FIG. 5, a beam splitter 70 similar to that discussed above with respect to FIG. 2 can be used. (Again, the coatings for the portions 72, 74 are preferably disposed on the front surface of the beam splitter 70, and the back surface of the beam splitter 70 is preferably coated with an AR coating 73. Also, if appropriate, one or more actuators 75 can be used to move the beam splitter 70.) Here, the beam splitter 70 can be positioned in the collimated beam CB between the reflectors 66*a-b*. In some cases, the distance between the reflectors 66*a-b* is preferably short so that the entire size of the housing 60 can be more compact, in which case another arrangement may be preferred.

In FIG. 5, the light for heating comes from one side of the process and the feeding wire comes from the other side of the process. In other words, the head 50 in FIG. 5 may be moving to the left in the depiction (direction D), and the feed of the wire W may be on that side of the laser beam LB. Accordingly, the light from the fiber 40 may provide post-heating of the joining process. Of course, the fiber 40 here can be arranged on the other side to provide pre-heating. However, any of the arrangements disclosed herein can be arranged for pre-heating, post-heating, or both.

In other alternatives, more than one beam splitter 70, 80 can split more than one secondary beam SB to more than one secondary fiber 40, or one beam splitter 70, 80 can split off several secondary beams SB to several optical fibers 40. A corresponding retrofit of the laser processing head 50 is also the subject of the present disclosure. For example, retrofit elements of a beam splitter 70/80, optic 76/86, fiber 40, and the like can be added to an existing head 50 to configure the head 50 for delivering the secondary laser beam SB as disclosed herein.

The output 42 of the secondary fiber 40 can have various arrangements depending on the heating spot(s) to be produced by the secondary beam SB. As noted, the output 42 can include any appropriate optics, cover slide, cross-jet, cooling, etc. In general, the output 42 of the secondary fiber 40 can have a plain tip (i.e., a fiber tip lacking any form of beam-shaping element). In particular, the plain tip can be used to produce an acceptable spot size depending on the distance of the output 42 to the workpiece and the numerical aperture involved. For example, if the distance of the output 42 to the workpiece is 80 mm and the numerical aperture is only 20 mrads, then a 3.2 mm spot can be formed without the need for any imaging optics, such as a beam-shaping element, at all. Alternatively, a beam-shaping element can be located at the output 42 of the secondary fiber 40. Also, the intensity profile of the secondary beam SB of the secondary fiber 40 can be adapted at the output 42 to meet the requirements of a joint.

Figure 6:
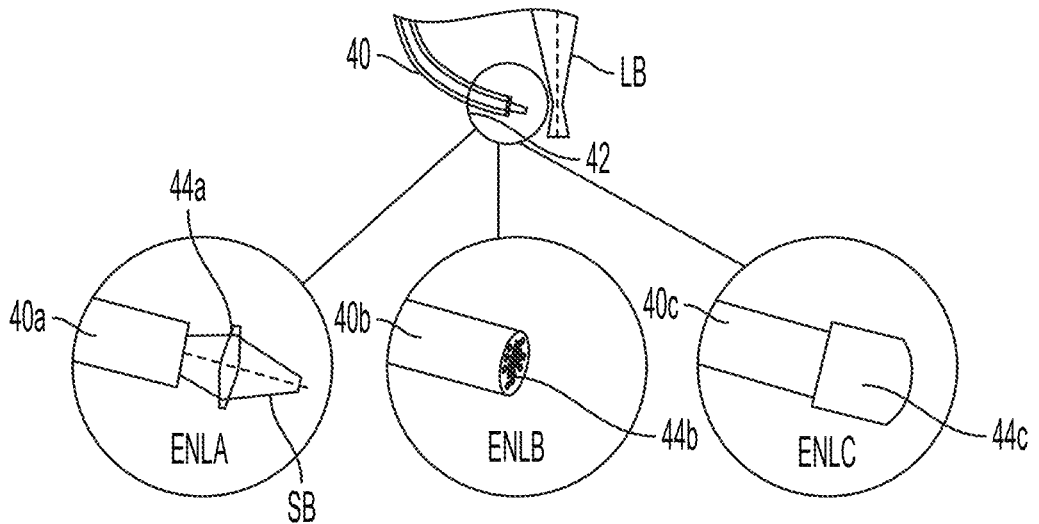
FIG. 6 illustrates embodiments of an output end for the secondary fiber.

Possible embodiments of the output 42 for the secondary fiber 40 are shown in enlargements ENLA, ENLB, and ENLC of FIG. 6. In enlargement ENLA, a distal end of the secondary fiber 40a is arranged in front of a micro-lens 44a for the output 42. The lens 44a can be disposed in an end cap or housing connected to the end of the fiber 40a.

In enlargement ENLB, the secondary fiber 40b includes microfibers 44b exposed at the output 42. The microfibers 44b can disperse or otherwise direct the shape of the laser light for the heating spot(s). The microfibers 44b can also be distributed at the output 42 so the microfibers 44ab in combination with a focusing lens (not shown) can give a desired shape of a pre-heating spot. At the input side of the fiber 40, the microfibers 44b can be bundled to form a packed input for the focus of the lens 76.

In enlargement ENLC, an optical block 44c is coupled to the end of the fiber 40c. The optical block 44c can be configured to shape the secondary beam into a line or other shape. As shown, for example, the optical block 44c can be fanned out so the secondary beam can be formed into a beamline to vaporize coatings and/or heat the workpieces. Other configurations can be used. For example, a diffractive optical element can be used on the distal end of the fiber 40.

Figure 7:
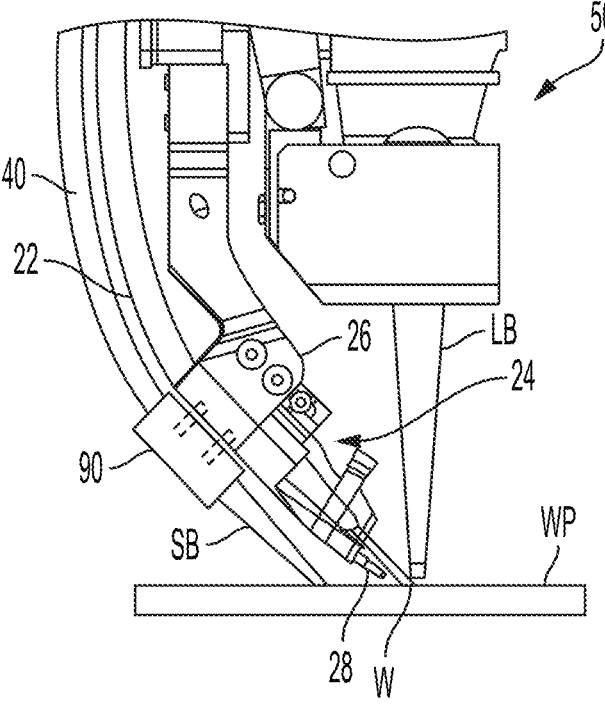
FIG. 7 illustrates an assembly having a secondary fiber arranged on a wire guide.

As noted above, the secondary beam SB is delivered adjacent the main laser beam LB in a location near the wire that is fed to the processing area. FIG. 7 illustrates an assembly having a secondary fiber 40 arranged on a guide 26 at the wire outlet 24 on the end 58 of the housing's arm 56. A mechanical fastener or clamp 90 attaches the secondary fiber 40 to the guide 26. As shown, the guide 26 connects to the cable 22 delivering the wire W adjacent the main laser beam LB. The guide 26 can include a mechanical guide finger 28 to engage workpiece(s), such as to track the seam and apply a force as discussed herein.

FIGS. 8A-8E illustrate plan views of beam splitters 100 according to the present disclosure. As noted above, the beam splitter 100 of the present disclosure can include at least two reflective portions, including an anti-reflective portion and a high-reflective portion. As also noted above, the at least two reflective portions can be located in at least two areas of the beam splitter 100, including an inner area and a peripheral area. As even further noted, the shape of the areas can have a round, an elliptical, or an oval shape. This configuration can be best suited when the central portion of the collimated beam can provide the highest brilliance and when the design is intended to split the highest brilliance to the secondary beam. Lateral movement of the beam splitter 100 can adjust how much of the highest brilliance (and hence total power) is directed to the secondary beam. As will be appreciated with the benefit of the present disclosure, however, other configurations are possible.

First, in some implementations, it may not be desired or necessary that the portion of the collimated light directed to the secondary beam includes the central light (i.e., that light of highest brilliance). Instead, the light directed to the secondary beam either by the HR portion or the AR portion of the beam splitter 100 depending on the implementation can be located elsewhere in the collimated beam, such as offset from the center of the beam splitter. Depending on the light, for example, the brilliance from an offset portion of the beam splitter 100 may be lower, but may still be sufficient for the pre-heating, post-heating, or other purposes disclosed herein. Moreover, although the collimated beam may tend to be more brilliant in the center, laser light having a flatter power distribution in the collimated beam may be available.

Figures 8A, 8B, 8C, 8D, 8E, 9A, 9B:
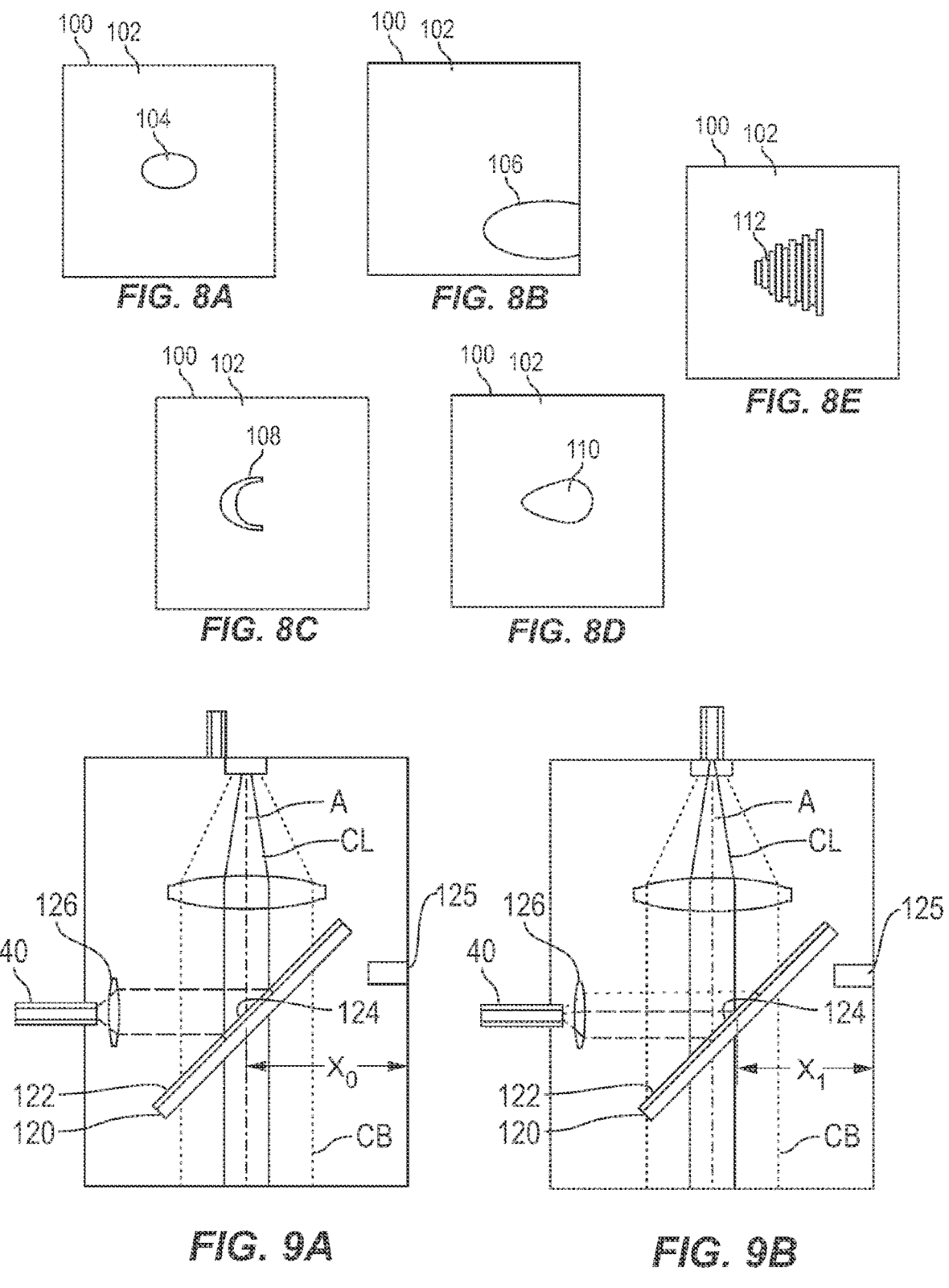
FIGS. 8A-8E illustrate plan views of beam splitters according to the present disclosure.
FIGS. 9A-9B illustrate schematic views of a beam splitter having its lateral orientation moved to alter the secondary output of the laser light.

With this understanding in mind, FIG. 8A shows the beam splitter 100 having at least two portions 102, 104 (e.g., AR and HR portions) located in a peripheral area and an inner area comparable to those described above. The portion 104 in the inner area can be the HR portion, and the portion 102 in the peripheral area can be the AR portion. A reverse arrangement is also possible. Because the beam splitter 100 is angled with respect to the optical axis of the collimated beam, the inner area's portion 104 can have an oval or elliptical shape as already discussed. Yet, the size and shape of the portions 102, 104 and areas can be configured as needed.

In FIG. 8B, the beam splitter 100 again has at least two reflective portions 102, 106. A first "inner" portion 106 is located inside the second "peripheral" portion 102, but the first portion 106 is offset from the center of the beam splitter 100. The first portion 106 can even be arranged toward the edge of the beam splitter 100, as also depicted. The first portion 106 can be the HR portion, and the second portion 102 can be the AR portion. A reverse arrangement is also possible. Because the beam splitter 100 is angled with respect to the optical axis of the collimated beam, the inner portion 106 can have an oval or elliptical shape as already discussed. Yet, the size and shape of the portions and areas can be configured as needed.

The portions of the beam splitter 100 can be freely shaped areas, and the beam splitter 100 with the lithographic areas of anti-reflective and high-reflecting portions can shape the redirected beam. For example, FIG. 8C shows an inner portion 108 having a free-formed type of shape, such as a half-moon as shown, but could be any other shape. A ring shape, a cross shape, or the like could also be used. A specific shape such as this one used for one of the portions 108 can be more or less preserved in the light during transport through the short fiber of the secondary output. In this way, the shaped light can produce a specific power distribution outside the near field of the laser spot.

FIG. 8D shows how one of the portions (e.g., inner portion 110) can have a shape other than round or elliptical. FIG. 8E shows how one of the portions (e.g., inner portion 112) can be comprised of several discrete portions having the same or different reflectivity from one another in a given shape and orientation. The shape of the portions 102, 104, 106, 108, 110, 112 can provide a specific power distribution in the secondary beam and can provide a gradient or discrete steps of the delivered power based on a lateral position of the beam splitter 100. As these examples with the portions 102, 104, 106, 108, 110, 112 show, various configurations can be used for the beam splitter 100 of the present disclosure, and the shape of the portions can be symmetric, asymmetric, uniform, non-uniform, or the like.

As noted above, the orientation of the beam splitter of the present disclosure can be changed to alter the secondary output of the laser light. For example, a change in the lateral orientation of the beam splitter can adjust the amount of light reflected by the HR coating to the lens for delivery to the fiber.

FIGS. 9A-9B illustrate schematic views of a beam splitter 120 having its lateral orientation moved to alter the secondary output of the laser light. The optical power coupled into the secondary fiber 40 can be adjusted by translating the beam splitter 120 relative to the optical axis A of the collimated main beam CB. The beam splitter 120 in this example has a peripheral portion with an anti-reflective coating 122 and has an inner or central portion with a high-reflective coating 124.

In FIG. 9A, the beam splitter 120 is set at lateral position $x_0$ with a center of the splitter 120 aligned to the optical axis A. As shown, the beam splitter 120 can be set at an angle (e.g., 45-degrees), which can be fixed or adjustable. A larger amount of the central light CL is reflected by the HR coating 124 to the lens 126 and the fiber 40. In FIG. 9B, the lateral orientation of the beam splitter 120 has been adjusted to another lateral position $x_1$ so that the splitter's center is not aligned with the optical axis A. As will be appreciated, the HR coating 124 still has the same size so the dimension of the secondary beam reflected from the HR coating 124 towards lens 126 stays the same. However, because the HR coating 124 is not centered with respect to the optical axis A anymore, less of the central light CL is reflected by the HR coating 124. Therefore, the off-axis part of the HR coating 124 produces a part of the reflected beam having lower power. The movement can use one or more actuators 125, such as a motor, solenoid, or the like. This change in the lateral orientation of the beam splitter 120 adjusts the amount of central light CL reflected by the HR coating 124 to the lens 126 for delivery to the fiber 40.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A laser processing head for directing laser light to a workpiece, the laser processing head comprising:
   a collimator disposed in an optical axis of the laser light and being configured to collimate the laser light into collimated light;
   a beam splitter disposed at a non-normal angle with respect to the optical axis in the collimated light and having at least two portions, the at least two portions being on a surface of the beam splitter comprising an anti-reflective portion adapted to pass the collimated light through the beam splitter and a high-reflective portion, wherein the at least two portions comprise a peripheral region of the surface and an inner region of the surface, respectively, the peripheral region surrounding the inner region, and the inner region comprising the high-reflective portion, the beam splitter being configured to split the collimated light into first light from a first of the at least two portions and into second light from a second of the at least two portions;
   a main output disposed in optical communication with the beam splitter, the main output being configured to direct at least the first light into a main laser beam toward the workpiece; and
   a secondary output disposed in optical communication with the beam splitter, the secondary output being configured to direct at least the second light into a secondary laser beam adjacent the main laser beam.

2. The laser processing head of claim 1, wherein the collimator comprises one or more lenses.

3. The laser processing head of claim 1, wherein the beam splitter comprises a substrate; wherein the high-reflective portion comprises a high reflective coating lithographically structured on the substrate or on top of an anti-reflective coating.

4. The laser processing head of claim 1, wherein the beam splitter is disposed at a lateral position relative to the optical axis, the lateral position being adjustable relative to the optical axis, the lateral position being configured to adjust an amount of the first light, the second light, or the first and second light split by the beam splitter.

5. The laser processing head of claim 1, wherein the main output comprises a focusing lens disposed on the optical axis and being configured to focus any of the collimated light, communicated from the beam splitter and incident to the focusing lens, into the main laser beam toward the workpiece.

6. The laser processing head of claim 5, wherein the main output comprises at least one reflector disposed in the optical axis between the beam splitter and the focusing lens and being configured to reflect any of the collimated light communicated from the beam splitter and incident to the focusing lens.

7. The laser processing head of claim 1, wherein the secondary output comprises:
   at least one focusing lens disposed in optical communication with the beam splitter and being configured to focus any of the collimated light communicated from the beam splitter and incident to the focusing lens; and
   at least one waveguide having an input disposed in optical communication with the focusing lens and having an output disposed in optical communication toward the workpiece.

8. The laser processing head of claim 7, wherein the waveguide comprises an optical fiber or a bundle of micro-fibers.

9. The laser processing head of claim 7, wherein the output of the waveguide comprises a micro-lens, an optical block, a beam shaping element, or a plain tip.

10. The laser processing head of claim 1,
   the beam splitter being configured to split the collimated light into inner light from the inner region and into peripheral light from the peripheral region;
   wherein the main output is configured to direct at least the peripheral light as the first light into the main laser beam toward the workpiece; and
   wherein the secondary output is configured to direct at least the inner light as the second light into the secondary laser beam adjacent the main laser beam.

11. The laser processing head of claim 9, wherein the inner region of the beam splitter comprises an elliptical shape, an oval shape, a symmetric shape, an asymmetric shape, a uniform shape, or a non-uniform shape.

12. The laser processing head of claim 1, wherein the main output comprises a reflector disposed between the collimator and the beam splitter, the reflector being configured to at least partially reflect any of the collimated light incident thereto.

13. The laser processing head of claim 1, wherein the inner region is ovular.

14. The laser processing head of claim 1, wherein the inner region has a free-formed shape.

15. The laser processing head of claim 1, wherein the inner region has a non-uniform shape.

16. The laser processing head of claim 1, wherein the inner region is comprised of a plurality of discrete portions.

17. The laser processing head of claim 1, wherein the inner region is offset from the center of the surface.

18. The laser processing head of claim 1, further comprising an actuator adapted to laterally translate the beam splitter with respect to the optical axis.

19. A method to direct laser light to a workpiece, the method comprising:

collimating the laser light into collimated light along an optical axis;

splitting the collimated light into first light and second light using a beam splitter having at least two portions on a surface of the beam splitter, including an anti-reflective portion adapted to pass the collimated light through the beam splitter and a high-reflective portion, wherein the at least two portions comprise a peripheral region of the surface and an inner region of the surface, respectively, the peripheral region surrounding the inner region, and the inner region comprising the high-reflective portion;

directing at least a portion of the first light into a main laser beam toward the workpiece; and directing at least a portion of the second light into a secondary laser beam toward the workpiece.

20. The method of claim 19, further comprising delivering a wire to the main laser beam; and wherein directing at least the portion of the first light into the main laser beam toward the workpiece comprises melting the wire with the main laser beam.

21. The method of claim 19, wherein splitting the collimated light into the first light and the second light using the beam splitter comprises:

reflecting the second light from the high-reflective portion in an inner area of the beam splitter, and passing the first light through the anti-reflective portion in a peripheral area of the beam splitter.

22. The method of claim 19, wherein directing at least the portion of the second light into the secondary laser beam toward the workpiece comprises:

pre-heating the workpiece using the secondary laser beam before a joint is made; or heating the workpiece using the secondary laser beam after a joint is made.

23. The method of claim 19, further comprising adjusting an amount of the second light directed to the secondary beam by translating the beam splitter perpendicular to the optical axis.

\* \* \* \* \*